Patented Oct. 11, 1932

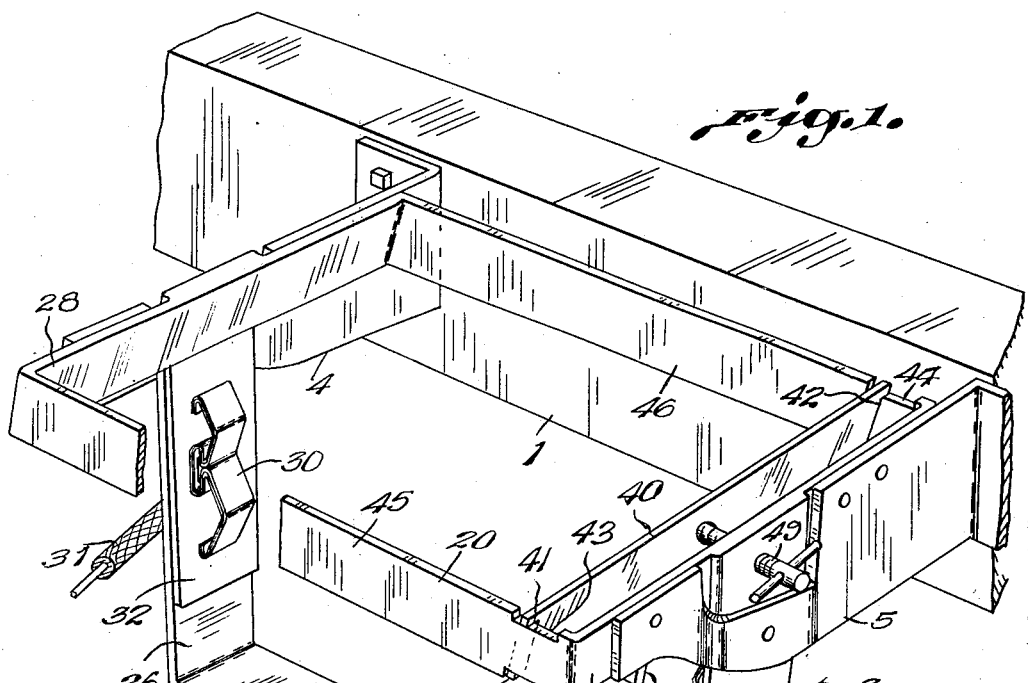

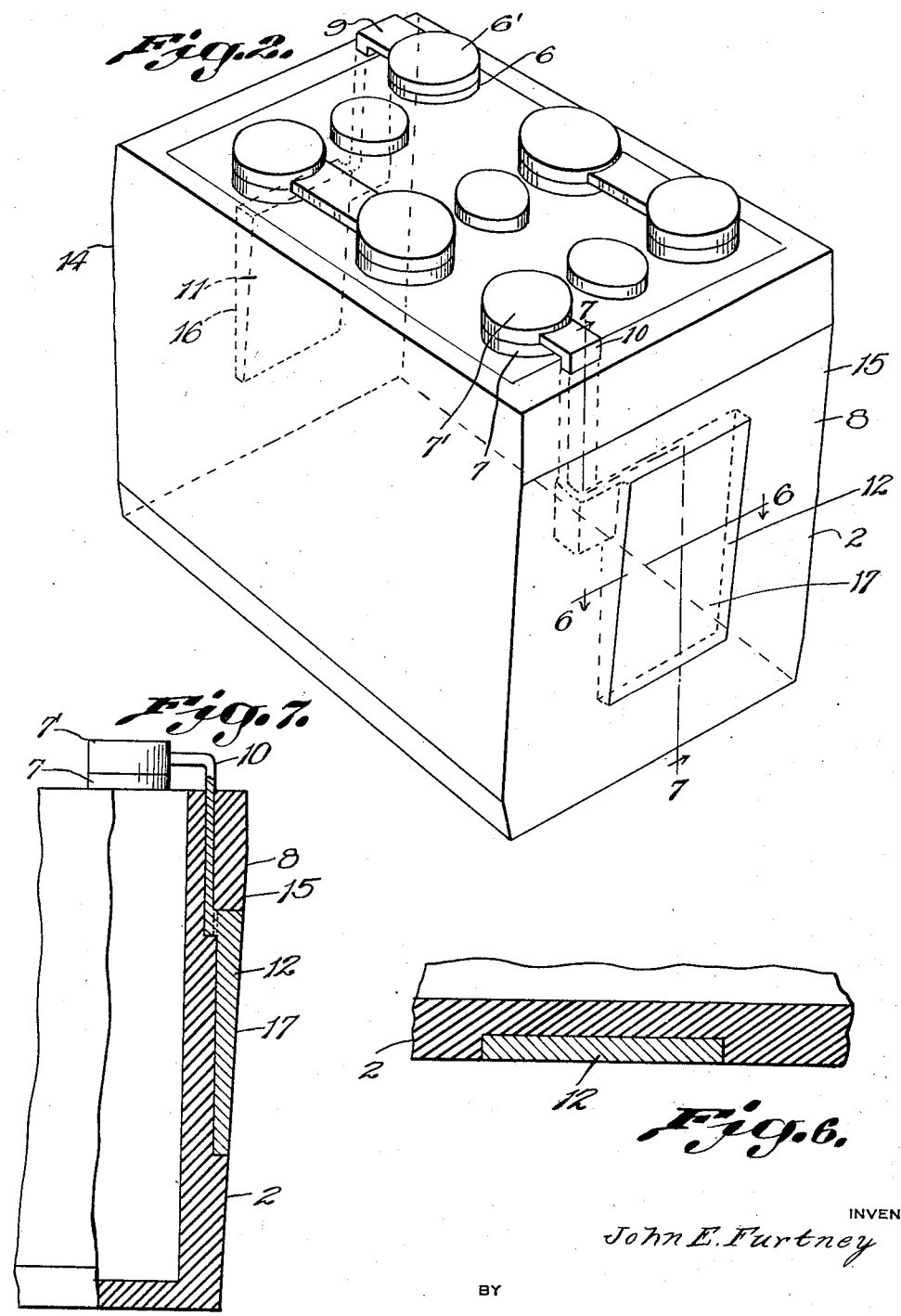

1,881,461

UNITED STATES PATENT OFFICE

JOHN E. FURTNEY, OF DETROIT, MICHIGAN

BATTERY CARRIER TERMINAL ASSEMBLY

Application filed March 5, 1929. Serial No. 344,405.

This invention relates generally to storage battery assemblies, particularly to batteries and carriers therefor designed for use in connection with motor vehicles and the like and consists of certain novel features of construction, combinations and arrangements of parts that will be hereinafter more fully described and particularly pointed out in the appended claims.

In the accompanying drawings:

Figure 1 is a fragmentary perspective view of a chassis with a battery carrier embodying my invention attached thereto;

Figure 2 is a perspective view of a battery embodying my invention;

Figure 3 is an enlarged fragmentary sectional view of the carrier showing the clamping device in detail;

Figure 4 is an enlarged fragmentary sectional view of one of the battery terminals;

Figure 5 is a view similar to Figure 4 but showing the other battery terminal;

Figure 6 is a horizontal sectional view taken on the line 6—6 of Figure 2;

Figure 7 is a vertical sectional view taken on the line 7—7 of Figure 2;

Referring now to the drawings, 1 is a chassis sill member of a motor vehicle, 2 is a storage battery, 3 is a carrier for the battery, and 4 and 5 respectively are brackets rigidly secured to and projecting from the chassis sill member 1 and supporting said carrier 3 and battery 2.

In the present instance the terminals 6 and 7 of the battery 2 have plugs 6' and 7' rigid with the battery casing 8, being preferably burnt thereon, and are electrically connected by lead straps 9 and 10 to lead plates 11 and 12 respectively embedded in the rubber of the casing 8, preferably at opposite ends thereof. As shown, these straps 9 and 10 extend laterally from the terminals 6 and 7, are embedded in the rubber of the casing 8, and are connected to the plates 11 and 12, said connections being also embedded in the rubber of the casing. Preferably the outer faces of the plates 11 and 12 inclined downwardly and inwardly as shown and the end walls of the battery also taper downwardly so that the tapered faces 14 and 15 thereof are flush with the inclined outer faces 16 and 17 of the plates 11 and 12.

As shown, the carrier 3 has a substantially rectangular frame 20, a substantially U-shaped stirrup 21 depending from the frame 20 at the center thereof, and a cross bar 22 secured to and crossing the base 23 of the stirrup 21 and provided at its opposite ends with upstanding flanges 24 and 25 respectively. Preferably the frame 20 is held by the brackets 4 and 5 in a substantially horizontal position at one side of the sill member 1 and it is of sufficient size to enable a battery such as 2 to be readily placed in or removed from the stirrup 21. As shown, the upstanding arms 26 and 27 of the stirrup are rigidly secured to the end bars 28 and 29 of the frame 20 and converge slightly from the frame 20 to the base 23 of the stirrup. Mounted on these arms 26 and 27, preferably at points substantially midway the ends thereof are electrical terminals 30 and 31, preferably of spring metal that are adapted to be engaged by the contact plates 11 and 12 of the battery 2 when the latter is received in the stirrup 21. Preferably each terminal 30 and 31 consists of four pieces of bronze strap metal bent into the configuration shown so that they yieldingly engage the battery plates 11 and 12 when the battery is in the stirrup. One of the terminals, preferably 30, is insulated by suitable means such as the rubber strip 32 from the arm 26 of the stirrup and is electrically connected by a bolt 33 to the usual electrical switch cable 34 of the vehicle. Washers 32' and 32'' are sleeved upon the bolt 32 and insulate the same from arm 26 of the stirrup. The other terminal 31 is connected by a bolt 35 and nut 36 to the arm 27, and since the holder of which the arm 27 is a part is connected by the brackets 4 and 5 to the chassis frame member 1, the said terminal 31 is grounded to the chassis frame.

For holding the battery 2 in the stirrup 21, I have provided a clamping arm 40 substantially parallel to the end bar 29 of the frame and having recesses 41 and 42 in its opposite ends receiving and slidably engaging reduced portions 43 and 44 respectively of the side bars 45 and 46 of the frame. With this construction a nut 47 is non-rotatably but slidably received in a correspondingly shaped opening 48 in the end bar 29 of the frame, and constitutes a threaded bearing for a thrust member or screw 49 that serves as an actuator for the bar 40 to effect the desired clamping engagement between the bar and battery. Preferably the reduced portions 43 and 44 are adjacent to the end bar 29 and are of such a length that the nut 47 may move longitudinally of the opening 48 in the bar 29 but cannot because of the construction and arrangement of parts just described, become entirely disengaged from the end bar 29 when the clamping bar 40 is adjusted to the inner ends of the reduced portions 43 and 44.

In use, a battery such as 2 may be readily inserted in the holder and when so inserted the plates 11 and 12 will contact with the terminals 30 and 31 on the arms 26 and 27 of the stirrup of the carrier. The clamping device 40 may then be adjusted to securely hold the battery in place. Likewise the battery may be easily and quickly removed from the holder or carrier by simply loosening the clamping device and lifting the battery from the holder.

If however, the driver of a motor vehicle equipped with a battery such as 2 finds it necessary to replace the battery by a different form of battery, i. e., one devoid of the contact plates 11 and 12, and is unable to obtain another battery such as 2 having contact plates 11 and 12 as a replacement, a standard type battery may be readily placed in the carrier and may be easily and quickly electrically connected in the usual manner to the chassis sill member 1 and cable 34 by merely connecting the cable 34 directly to the terminal 7 or strap 10 and connecting a suitable ground strap to the terminal 6 or strap 9 and to the frame 1.

Thus, from the foregoing description, it will be readily apparent that I have provided a battery assembly that is simple in construction and that can be manufactured and installed at a comparatively low cost. Inasmuch as the carrier is of open top type the battery may be easily and quickly placed in or removed therefrom, and since the battery carries contact plates at its opposite ends the electrical connections between the battery and the carrier will be effected automatically when the battery is placed in the stirrup of the carrier.

With my construction the lead-off cable 34 to the switch is now connected to the insulated terminal 30 at the rear end of the carrier hence the time consumed for taking a battery out of the carrier and replacing the same in the carrier has been materially reduced also. My construction eliminates the usual clamps, and also eliminates the necessity of adjusting the battery terminals to which the lead-offs are connected. My construction also eliminates corrosion. Moreover, the location of the contacts 11 and 12 at the ends of the battery is an important factor since these contacts are away from fumes and acid. In fact, since the terminal plugs 6' and 7' are rigid with the battery casing, the battery is sealed except for the usual vents provided in said plugs, hence damage caused by spilled acid has been eliminated entirely. Heretofore the take-offs such as 9 and 10 have been brass which would not stand the acid. Now the take-offs such as 9 and 10 are formed of lead which is cheaper to manufacture. Moreover with the present construction these take-offs 9 and 10 are embedded in the casing of the battery so that they are insulated from the frame 20 of the holder. Since the terminals 6 and 7 are rigid with the battery casing, there is no necessity for loosening the posts which heretofore have become damaged when the terminal plugs were adjusted, and the life of a battery such as 2 illustrated herein has been lengthened. Furthermore it is not likely that the casing 8 of the battery would ever be broken when the battery is taken out or placed in the carrier and due to the connections I have provided, a saving of the usual ground strap, the usual battery hold downs and associated bolts has been effected since these parts have been eliminated entirely from my construction. The cost of manufacturing battery assemblies such as those shown herein has therefore been accordingly reduced. It will also be noted that the lead-off cable 34 to the switch is now connected to the insulated terminal 30 at the rear end of the carrier, hence is protected from splashing mud, water, etc. The other terminal is grounded to the carrier and the carrier is grounded to the frame. Moreover, only one clamping device such as 40 is required with my construction for holding the battery, whereas heretofore two or more have been required. Furthermore, the hold downs used in the past oftentimes distorted the box or carrier for the battery but due to my present construction such distortion of parts has been eliminated entirely.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A terminal for a battery carrier comprising an upright supporting arm, a headed electrical conductor element projecting laterally from said arm, and a spring metal contact member anchored on said element and including a laminated strip having opposed return bent portions intermediate its ends receiving opposite sides of the head of said element, said contact member having portions inclining outwardly from said return bent portions for contacting relation with battery contact plates and having return bent end portions.

2. A terminal for a battery carrier comprising an upright supporting arm, a headed electrical conductor element projecting laterally from said arm, and a spring metal contact member anchored on said element and including a strip having opposed return bent portions intermediate its ends embracing opposite edges of the head of said element, said contact member having return bent end portions, and having the portions intermediate said first and second mentioned portions disposed in spaced relation to the supporting arm for contacting relation with battery contact plates and the like.

3. A terminal for a battery carrier comprising an upright supporting arm, a headed electrical conductor element projecting laterally from said arm, and a spring metal contact member anchored on said element and including a strip having a portion intermediate its ends engaging the headed element, said contact member having portions extending outwardly relative to the supporting arm for contacting relation with battery contact plates and having the end portions thereof extending inwardly toward said supporting arm upon opposite sides of the first mentioned portion.

In testimony whereof I affix my signature.

JOHN E. FURTNEY.